Figure 1:
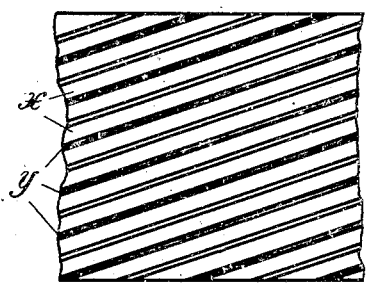

Oct. 11, 1927.

R. RÜDENBERG

INDUCTION MOTOR

Original Filed May 11, 1917

1,645,296

Inventor
Reinhold Rüdenberg
by Knight Bro.
Attorneys

Patented Oct. 11, 1927.

1,645,296

UNITED STATES PATENT OFFICE.

REINHOLD RÜDENBERG, OF CHARLOTTENBURG, NEAR BERLIN, GERMANY, ASSIGNOR, BY MESNE ASSIGNMENTS, TO WESTINGHOUSE ELECTRIC & MANUFACTURING COMPANY, A CORPORATION OF PENNSYLVANIA.

INDUCTION MOTOR.

Original application filed May 11, 1917, Serial No. 168,031, and in Germany March 30, 1916. Divided and this application filed November 13, 1924. Serial No. 749,788.

My invention relates to asynchronous induction motors and to improvements in means for producing in the rotor an effective resistance loss thru leakage fields in the rotor, which loss rises as the slip increases so as to obtain the full or nearly the full torque of the motor at speeds which differ considerably from the synchronous speed.

The particular improvement to which the present invention relates constitutes a specific form of conductors used in carrying out the general idea of the above mentioned improvements disclosed in my copending application, Ser. No. 168,031, filed May 11, 1917, patented February 24, 1925, No. 1,-527,332, from which the present application has been divided.

Asynchronous motors are usually constructed with as small a resistance in the secondary circuit as possible, because by the value of this resistance the energy losses in the rotor as well as the slip of the motors at increasing load are determined, both the energy losses and the slip being always kept as low as possible. In motors of this type special arrangements are necessary in order to obtain a sufficient starting torque from the rest position of the motor, because these motors lose their torque as soon as the slip increases beyond a certain value.

In such arrangements which serve the purpose of increasing the starting torque either outside resistances are inserted into the secondary circuit or else the secondary circuit of the asynchronous motor inductively affects a tertiary circuit into which latter a controlled resistance is inserted.

It is however, possible for the same purpose to arrange in the secondary leakage field metal layers which use up the slip energy by means of the tertiary currents induced in them by the secondary stray-field. For such tertiary conductors in the secondary stray-field the secondary circuit conductors adjacent to other secondary conductors may be used, provided care is taken that the secondary stray-field has sufficient intensity at the points which are of importance for the production of tertiary currents.

Thus for instance according to the present invention the rotor conductors may be sub-divided into a suitable number of strands and the rotor conductors located in the slots can be used as tertiary circuit conductors for producing strong energy losses and thus means for controlling the motor, if between the individual conductor strands iron insertions are placed thru which the secondary stray-fields are strengthened. These iron insertions therefore principally serve the purpose to further the development of the secondary stray-field, owing to their magnetic conductivity. As the actual conductors for the tertiary currents, principally the rotor conductors themselves are used, though in some cases also the iron conductors may be used for conducting the current. Chiefly, however, these iron insertions do not figure as conductors for the tertiary currents.

Figures 2, 3:
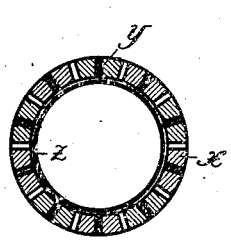

In the accompanying drawings the detailed construction of such a stranded slot conductor provided with iron insertions is illustrated, Figure 1 showing a side view of a portion of such a strand conductor;

Figure 2 showing a transverse section thereof, and

Figure 3 showing a transverse section thru a conductor in an intermediate manufacturing stage as will be explained hereinafter.

The construction shown in the drawings may be used for instance for a squirrel-cage rotor, the conductor shown for instance in Figure 2 being inserted in that form into the slots of the rotor.

The conductor shown in Figures 1 and 2 consists of a number of individual strands twisted together or otherwise transposed so as to maintain a uniform current displacement thruout the entire conductor in well known manner. The individual strands are slightly insulated from each other. Each strand is composed of two copper conductors $x$, one disposed above the other and separated by an iron insertion $y$. Since owing to the twisting or transposition of the strands each strand occupies the same position in the slot thruout its whole length as the other strands, the secondary currents will flow uniformly in all strands. These currents produce stray-fields in the iron insertions of suitable intensity, by which fields in turn tertiary currents are induced which pass in the upper halves of each strand in one direction and return in the lower halves of these strands in the other direction. In order to obtain a good return circuit for the tertiary currents, the two copper halves of each strand are preferably soldered or welded together at the upper and lower edge of the entire slot conductor. These conductive connections within each strand may also be made thruout its whole length and even the iron insertion, as already pointed out hereinbefore, may be added as a conductor by metallically connecting it with the copper conductors between which it is placed.

In order to take care that the slot stray-field in the iron insertions does not only strongly develop at the points where two insertions cross each other (on account of the twisting of the strands which for instance in Figure 1 are inclined to the left, whereas the strands located on the other side of the conductor shown in Figure 1 would be inclined towards the right) but so that it may develop thruout the whole length of the insertions, I prefer to insert an iron core $z$ into the center of the entire conductor so that it is surrounded by all strands (see Figure 2). This core then takes care that all stray lines of force are uniformly conducted and at the same time this core, acting somewhat as a tertiary conductor, develops a certain, though small amount of useful eddy currents.

The use of twisted strands has the particular advantage that the heat generated by the electric energy consumption is uniformly generated in the entire conductor as a whole and not produced locally in certain spots only. Consequently the heating of the motor during the starting period can be kept within moderate limits and may be easily controlled by heat proof insulation of the slot conductors.

A twisted and stranded conductor of the type just described and of a cross-section shown in Figure 2 may conveniently be produced as follows: The conductor strands, each composed of two copper conductors $x$ and an iron insertion placed between the two conductor halves are twisted over a thin iron tube $z$ as shown is Figure 3. When the strands have been thus assembled as a complete tubular body, this body is flattened out so that it will assume the shape shown in Figure 2. If desired an open channel may be left in the center of the conductor by the flattening process (for instance by temporarily inserting a core of suitable material and removing this core after the conductor is completely flattened). Such an air channel is very useful for passing cooling air thru the conductor thru which the heat generated during the starting period may be easily carried away from the rotor.

The conductor shown and described hereinbefore may be combined with other means known in the art for increasing the starting torque of such motors. For instance metal layers may be placed into the end fields of the rotor. However, even without any additional means, the expedients shown and described and constituting the present invention produce very favorable effects at comparatively small dimensions of the rotor slot and normal dimensions of the slot conductors and teeth of the asynchronous motor.

Squirrel-cage rotors provided with conductors such as described above also have a reasonable slot stray-field which is all the more permissible since no appreciable end stray-field exists. Consequently the maximum torque developed by such motors is considerable and generally much greater than that developed by ordinary phase wound armatures.

Armatures according to the present invention may be constructed with extremely small conductor losses in the slots and in the end rings, and have a very small slip and high efficiency. Lastly, and most important of all, the effect produced by the tertiary currents in the secondary conductors produces a very effective loss resistance which strongly increases with increasing slip. This loss resistance may be suitably dimensioned by properly dimensioning the constituent elements of the conductor so that in case the speed varies considerably from the synchronous speed the motor always operates at the full or nearly full torque and it may be very easily controlled.

Rotors thus constructed do not require slip rings with their incident brush structure and they do not require starting and controlling resistances with their inconvenient contact apparatus but they may be easily controlled as to speed and reversal by a simple control of the main field of the motor by controlling its primary circuit in a simple manner.

I claim :—

1. An asynchronous motor having slot conductors composed of transposed strands and having an increased starting torque, the slip energy in the slot conductors being used up by tertiary currents induced in said conductors by the secondary stray-field, said conductors having iron layers inserted into the individual conductor strands, thru which layers the secondary slot field can pass.

2. An asynchronous motor having slot conductors composed of twisted strands and having an increased starting torque, the slip energy in the slot conductors being used up by tertiary currents induced in said conductors by the secondary stray-field, said conductors having iron layers inserted into the individual conductor strands, thru which layers the secondary slot field can pass, and an iron core around which said strands are twisted, said core serving for uniformly distributing the stray-field lines of force in said iron layers.

3. An asynchronous motor having slot conductors composed of transposed strands and having an increased starting torque, the slip energy in the slot conductors being used up by teritary currents induced in said conductors by the secondary stray-field, said conductors having iron layers inserted into the individual conductor strands, thru which layers the secondary slot field can pass, said iron layers serving simultaneously as current conductors.

4. An asynchronous motor having slot conductors composed of twisted strands and having an increased starting torque, the slip energy in the slot conductors being used up by tertiary currents induced in said conductors by the secondary stray-field, said conductors having iron layers inserted into the individual conductor strands, thru which layers the secondary slot field can pass, and an iron core around which said strands are disposed, said core serving for uniformly distributing the stray-field lines of force in said iron layers, said iron core consisting of a flat tubular element.

REINHOLD RÜDENBERG.